United States Patent
Yano et al.

(10) Patent No.: US 12,282,413 B2
(45) Date of Patent: Apr. 22, 2025

(54) DEBUGGING ASSISTANCE DEVICE, CONTROL SYSTEM, DEBUGGING ASSISTANCE METHOD, AND RECORDING MEDIUM

(71) Applicant: Mitsubishi Electric Corporation, Tokyo (JP)

(72) Inventors: Tetsuo Yano, Tokyo (JP); Shin Nakamura, Tokyo (JP); Koki Murano, Tokyo (JP); Yuki Yamanouchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/861,627

(22) PCT Filed: Jul. 29, 2022

(86) PCT No.: PCT/JP2022/029264
§ 371 (c)(1),
(2) Date: Oct. 30, 2024

(87) PCT Pub. No.: WO2024/024077
PCT Pub. Date: Feb. 1, 2024

(65) Prior Publication Data
US 2025/0103465 A1    Mar. 27, 2025

(51) Int. Cl.
*G06F 11/36*    (2025.01)
*G05B 19/05*    (2006.01)
(Continued)

(52) U.S. Cl.
CPC ......... *G06F 11/362* (2013.01); *G05B 19/056* (2013.01); *G05B 2219/13142* (2013.01)

(58) Field of Classification Search
CPC ............... G06F 11/362; G06F 11/3636; G06F 9/30036; G06F 9/3004; G06F 9/30145;
(Continued)

(56) References Cited

U.S. PATENT DOCUMENTS 11,036,617 B2 *   6/2021   Matsumoto ......... G06F 11/3471
11,797,420 B2 *  10/2023   Sakuma ............. G06F 11/3612
(Continued)

FOREIGN PATENT DOCUMENTS

JP   2020-013526 A   1/2020
JP   2020-191141 A   11/2020
WO  2021/210071 A1   10/2021

OTHER PUBLICATIONS

International Search Report and Written Opinion mailed on Sep. 27, 2022, received for PCT Application PCT/JP2022/029264, filed on Jul. 29, 2022, 11 pages including English Translation.

*Primary Examiner* — Thuy Dao
(74) *Attorney, Agent, or Firm* — XSENSUS LLP

(57) ABSTRACT

An input-output data collector collects, from a programmable logic controller, input-output data representing a log for a device in a program predetermined as a logging target program of one or more programs executable by the programmable logic controller. An input-output data generator generates, when a debugging target program is determined not to be included in the predetermined program, input-output data representing a log for a device in the debugging target program by executing a simulation program simulating an operation of the programmable logic controller.

20 Claims, 10 Drawing Sheets

(51) Int. Cl.
  *G06F 9/445* (2018.01)
  *G06F 9/455* (2018.01)
  *G06F 11/00* (2006.01)
  *G06F 11/34* (2006.01)
  *G06F 11/362* (2025.01)

(58) Field of Classification Search
  CPC .... G06F 9/321; G06F 11/3656; G06F 11/261; G06F 11/221; G06F 11/2007; G06F 11/2038; G05B 19/056; G05B 2219/13142; G05B 19/052; E21B 41/00; H04L 67/025; H04L 41/0226; H04L 69/08; G06Q 10/06
  See application file for complete search history.

(56) References Cited

U.S. PATENT DOCUMENTS

| | | | |
|---|---|---|---|
| 11,960,379 B2 * | 4/2024 | Iwamura | G06F 30/20 |
| 2020/0125061 A1 | 4/2020 | Miyasaka | |
| 2023/0128016 A1 | 4/2023 | Sakuma et al. | |

* cited by examiner

FIG. 7

| FEB. 15, 2022 TIME | M0 | M1 | M2 | D0 |
|---|---|---|---|---|
| 9:00:10:000 | ON | ON | OFF | 100 |
| 9:00:10:002 | ON | ON | ON | 100 |
| 9:00:10:004 | OFF | ON | ON | 101 |
| 9:00:10:006 | OFF | OFF | OFF | 101 |
| .... | .... | .... | .... | .... |

FIG. 8

DEVICES IN SPECIFIED PROGRAM: M0, M1, D0

| FEB. 15, 2022 TIME | M0 | M1 | D0 |
|---|---|---|---|
| 9:00:10:000 | ON | ON | 100 |
| 9:00:10:002 | ON | ON | 100 |
| 9:00:10:004 | OFF | ON | 101 |
| 9:00:10:006 | OFF | OFF | 101 |
| ...... | ...... | ...... | ...... |

*FIG. 9*

DEVICES IN SPECIFIED PROGRAM: M3,M4,M5,D1

| FEB. 15, 2022 TIME | M3 | M4 | M5 | D1 |
|---|---|---|---|---|
| 9:01:11:000 | ON | OFF | OFF | 200 |
| 9:01:11:002 | OFF | ON | OFF | 200 |
| 9:01:11:004 | ON | OFF | ON | 201 |
| 9:01:11:006 | OFF | ON | ON | 202 |
| ..... | ..... | ..... | ..... | ..... |

DEBUGGING ASSISTANCE DEVICE, CONTROL SYSTEM, DEBUGGING ASSISTANCE METHOD, AND RECORDING MEDIUM

CROSS-REFERENCE TO RELATED APPLICATION

The present application is based on PCT filing PCT/JP2022/029264, filed Jul. 29, 2022, the entire contents of which are incorporated herein by reference.

TECHNICAL FIELD

The present disclosure relates to a debugging assistance device, a control system, a debugging assistance method, and a program.

BACKGROUND ART

A programmable logic controller (hereafter referred to as a PLC) may collect device information used by a program being executed as log data, and debug the program based on such information when a trouble occurs. For example, Patent Literature 1 descries a device that assists in debugging by storing device information used by a pre-selected program as log data associated with time information.

CITATION LIST

Patent Literature

Patent Literature 1: Unexamined Japanese Patent Application Publication No. 2020-191141

SUMMARY OF INVENTION

Technical Problem

During debugging, a user may readily intend to debug a program that has been out of attention, or may intend to refer to a log for such a program. However, the technique described in Patent Literature 1 does not provide log information other than log information about devices used by programs pre-selected as targets of log data collection. Thus, a program that has not been pre-selected as a target of log data collection or a program in which troubles are rare may not be debugged easily or a log for such a program may not be referred to easily when a debugging assistance device cannot be connected to the PLC. As a result, debugging may take time and increase difficulty.

Under such circumstances, an objective of the present disclosure is to allow PLC programs to be debugged more easily.

Solution to Problem

To achieve the above objective, a debugging assistance device according to an aspect of the present disclosure assists in debugging of a program executable by a programmable logic controller. The debugging assistance device includes input-output data collection means and input-output data generation means. The input-output data collection means collects, from the programmable logic controller, input-output data representing a log for a device in a program predetermined as a logging target program of one or more programs executable by the programmable logic controller. The input-output data generation means generates, when a debugging target program is determined not to be included in the predetermined program, input-output data representing a log for a device in the debugging target program by executing a simulation program simulating an operation of the programmable logic controller.

Advantageous Effects of Invention

The debugging assistance device according to the above aspect of the present disclosure generates, when a debugging target program is added by a user, input-output data representing a log for a device in the debugging target program by executing the simulation program that simulates the operation of the programmable logic controller. For devices in the additional debugging target program for which no log data is collected, input-output data can be acquired for easier debugging.

BRIEF DESCRIPTION OF DRAWINGS

FIG. 7 is a diagram of example input-output data collected by an input-output data collector illustrated in FIG. 2;

FIG. 8 is a diagram of example input-output data generated by an input-output data generator illustrated in FIG. 2;

FIG. 9 is a diagram of example input-output data generated by the input-output data generator illustrated in FIG. 2.

DESCRIPTION OF EMBODIMENTS

Figure 1:
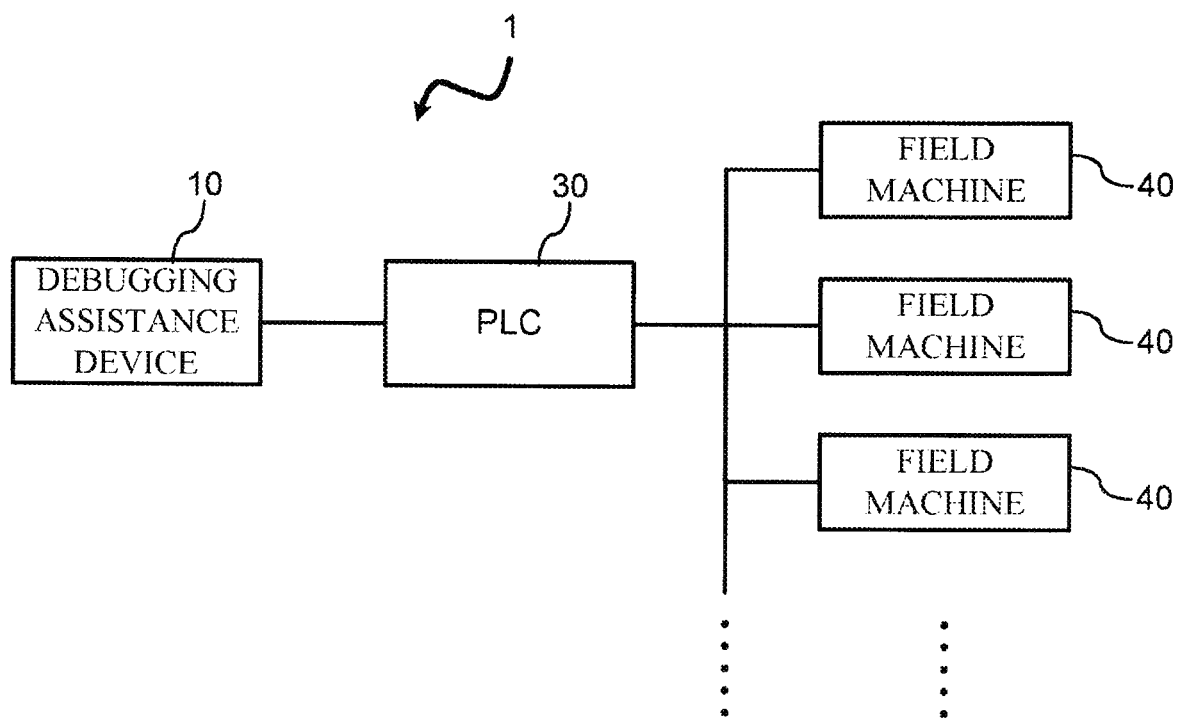
FIG. 1 is a diagram of a production system with debugging assistance according to an embodiment of the present disclosure, illustrating an overall configuration.

A debugging assistance device, a debugging assistance method, and a control system according to one or more embodiments of the present disclosure are described with reference to the drawings. Like reference signs denote like or corresponding components in the drawings.

Embodiment

A debugging assistance device, a debugging assistance method, and a control system according to one or more embodiments of the present disclosure are described specifically using a production system as an example.

As illustrated in FIG. 1, a production system 1 according to the present embodiment includes multiple field machines 40, a programmable logic controller (PLC) 30 that controls the field machines 40, and a debugging assistance device 10 that assists in debugging of a program executable by the PLC 30.

The field machines 40 are, for example, equipment or tools installed in a factory that performs various processes on workpieces to manufacture, for example, products or parts.

The PLC 30 is connected to each field machine 40 to allow communication. The PLC 30 executes a control program to control the field machines 40 to perform processes on workpieces.

The PLC 30 is also connected to the debugging assistance device 10 to allow communication. The PLC 30 stores an entire program including program parts, and can record logs for devices in one or more programs pre-selected from these program parts. The PLC 30 is an example of a programmable logic controller in an aspect of the present disclosure. The PLC 30 is described in detail later.

The debugging assistance device 10 does not perform a debugging process, but assists the user in debugging programs executable by the PLC 30 by facilitating the debugging process. More specifically, the debugging assistance device 10 acquires log data collected by the PLC 30 and presents the log data to the user for reference in debugging pre-selected programs. The debugging assistance device 10 also determines, for a program specified as appropriate by the user in addition to the pre-selected programs, whether the log data collected from the PLC 30 contains data equivalent to log data for a device in the additionally specified program, and extracts and presents any such data to the user to assist in the debugging process. The user may additionally specify a program readily upon, for example, suspecting a problem in a program other than the programs pre-selected as targets of logging. An additional target program is specified by a debugging target program specifier 112 (described later). Upon determining that the log data collected from the PLC 30 contains no data equivalent to log data for the additionally specified program, the debugging assistance device 10 executes a simulation program simulating the operation of the PLC 30 that executes the additionally specified program to acquire output data, and then presents a series of input data and a series of output data in comparison to the user to assist in the debugging process. This assists the user in debugging a program not pre-selected as a target of logging by the PLC 30. The debugging assistance device 10 is an example of a debugging assistance device in an aspect of the present disclosure. The functions of the debugging assistance device 10 are described in detail later.

Figure 2:
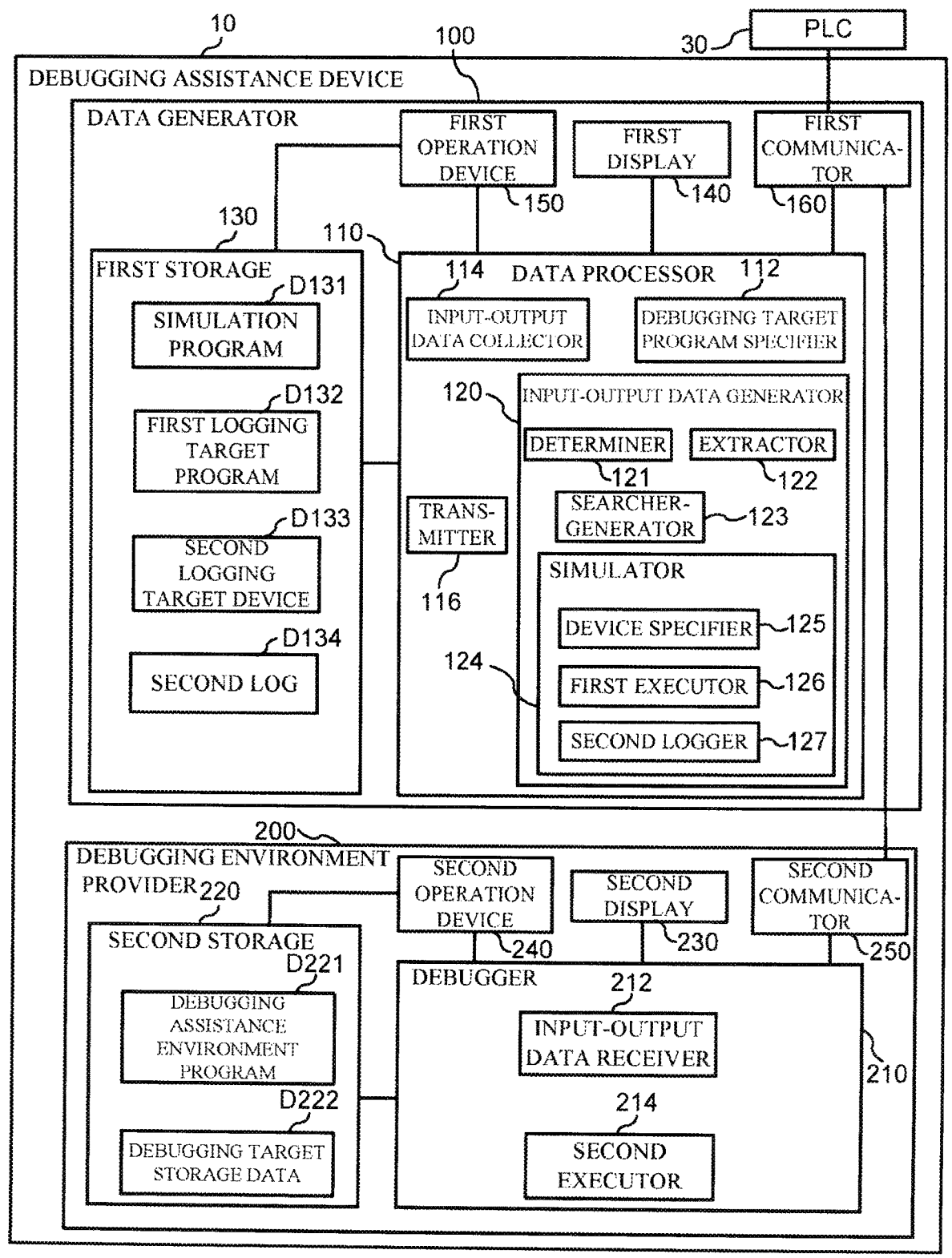
FIG. 2 is a functional block diagram of a debugging assistance device according to the embodiment of the present disclosure.

The functional configuration of the debugging assistance device 10 is now described with reference to FIG. 2. As illustrated, the debugging assistance device 10 includes a data generator 100 that generates input-output data and a debugging environment provider 200 that provides a debugging assistance environment based on the input-output data. The input-output data herein mainly refers to data input to or output from the PLC 30 during execution of a pre-selected program (hereafter simply referred to as input-output data) and logged by the PLC 30. The input-output data also refers to a set of a series of input data generated in simulating the operation of the PLC 30 and a series of output data output in response to the input of the series of input data into the simulation program.

The data generator 100 is, for example, a personal computer executing an engineering tool program. The engineering tool is used for operations such as creating programs and setting parameters associated with control involving the PLC 30 and the field machines 40. In the present embodiment, the engineering tool implements these functions and also generates input data for a program additionally specified as a debugging target (hereafter simply referred to as a specified program) other than programs pre-selected as debugging targets, and inputs the data to a simulation program to acquire output data.

The debugging environment provider 200 provides a debugging assistance environment for the user by, for example, displaying input-output data generated by the data generator 100 along with association between input data and output data. The debugging environment provider 200 is, for example, a personal computer.

The data generator 100 includes a data processor 110 that processes data, a first storage 130 that stores data, a first display 140 that displays information, a first operation device 150 that outputs a signal based on a user operation, and a first communicator 160 that allows communication.

The first display 140 includes, for example, a liquid crystal display, and displays, for example, a screen for specifying a program to be debugged.

The first operation device 150 includes, for example, input devices such as a keyboard, a mouse, and a touchpad.

The first storage 130 stores a simulation program D131, a first logging target program D132, a second logging target device D133, and a second log D134. The simulation program D131 simulates the operation and processing of the PLC 30. The first logging target program D132 is information identifying a program to be logged. The second logging target device D133 is information identifying a device in the debugging target program (hereafter referred to as a second logging target device for distinction). The second log D134 is log data for a device in the second logging target device D133.

The simulation program D131 simulates the operation and processing of the PLC 30. The simulation program D131 and the PLC 30 output the same data sequence upon input of the same data sequence.

The first logging target program D132 indicates identification information about each program executable by the PLC 30 and pre-selected as a logging target.

The second logging target device D133 indicates identification information about devices included in each program specified as a debugging target.

The second log D134 is log data for a device in the second logging target device D133.

The simulation program D131 is an example of a simulation program in an aspect of the present disclosure.

The first communicator 160 is connected to and communicates with the PLC 30 and the debugging environment provider 200. The first communicator 160 is implemented by, for example, a network interface. The first communicator 160 receives, for example, input-output data for each program in the first logging target program D132 from the PLC 30. The first communicator 160 also transmits the input-output data for each debugging target program to the debugging environment provider 200.

The data processor 110 includes a debugging target program specifier 112 that specifies a debugging target program, an input-output data collector 114 that collects input-output data, a transmitter 116 that transmits input-output data, and an input-output data generator 120 that generates additional input-output data to eliminate data shortage by simulation.

The debugging target program specifier 112 specifies an additional debugging target program based on a signal output from the first operation device 150 based on a user operation.

The input-output data collector 114 receives the input-output data for each pre-selected program for which logging is performed by the PLC 30 through the first communicator 160 and accumulates the input-output data.

The transmitter 116 transmits the input-output data collected or generated by the data generator 100 to the debugging environment provider 200 through the first communicator 160. The debugging target program specifier 112 is an example of debugging target program specifying means in an aspect of the present disclosure. The input-output data collector 114 is an example of input-output data collection means in an aspect of the present disclosure.

The input-output data generator 120 includes a determiner 121 that determines whether each debugging target program is a first logging target program, an extractor 122 that extracts input-output data for a debugging target program, a searcher-generator 123 that searches for and generates input-output data, and a simulator 124 that performs simulation. The input-output data generator 120 generates input-output data for a debugging target program. The input-output data generator 120 is an example of input-output data generation means in an aspect of the present disclosure.

The determiner 121 determines whether a debugging target program specified by the debugging target program specifier 112 is included in the first logging target program D132. The determiner 121 is an example of determination means in an aspect of the present disclosure.

The extractor 122 extracts, from the input-output data collected by the input-output data collector 114, a portion of data equivalent to the input-output data for each debugging target program, or in other words, a portion equivalent to the log data for a device in each debugging target program.

When a debugging target program is not included in the first logging target program D132, the searcher-generator 123 searches for and generates input-output data for the debugging target program. When the input-output data for the debugging target program, or in other words, the log data for a device in the debugging target program is included in the input-output data collected by the input-output data collector 114, the searcher-generator 123 generates equivalent input-output data as described in detail later. More specifically, the searcher-generator 123 generates input data for the debugging target program by extracting the data equivalent to the input-output data for the debugging target program from the input-output data for programs other than the debugging target program collected by the input-output data collector 114.

The simulator 124 generates data for a device used by the debugging target program by simulation when the determiner 121 determines that the debugging target program is not included in the first logging target program D132 and the searcher-generator 123 determines that the input-output data collected by the input-output data collector 114 includes no log data for the device in the debugging target program. The simulator 124 includes a device specifier 125 that specifies a device in the debugging target program, a first executor 126 that performs simulation, and a second logger 127 that performs logging for a device in the second logging target device D133.

The device specifier 125 specifies a device used by each debugging target program as a device in the second logging target device D133 in the first storage 130. The first executor 126 executes the simulation program D131. The first executor 126 sequentially provides the input data generated by the searcher-generator 123 to the simulation program D131 and acquires output data.

The second logger 127 records, as the second log D134, a log for the second logging target device D133 acquired by executing the simulation program in the first storage 130.

The debugging environment provider 200 provides a debugging assistance environment for a debugging target program based on the input-output data generated by the data generator 100. The debugging environment provider 200 includes a debugger 210 with control functions to provide a debugging assistance environment, a second storage 220 that stores data to provide a debugging assistance environment, a second display 230 that displays information to be displayed to a debugging operator, a second operation device 240 that outputs a signal based on an operation by the debugging operator, and a second communicator 250 that allows communication in the debugging environment provider 200.

The second display 230 includes, for example, a liquid crystal display. The second display 230 displays, for example, input-output data for a debugging target program.

The second operation device 240 includes, for example, input devices such as a keyboard, a mouse, and a touchpad.

The second storage 220 stores a debugging assistance environment program D221 that is executed to provide a debugging assistance environment. The second storage 220 also prestores the debugging target program as debugging target storage data D222. The debugging assistance environment program D221 is a program for displaying the input-output data for the debugging target program generated by the data generator 100 in chronological order. The display in chronological order is described in detail later.

The second communicator 250 communicates with the data generator 100. The second communicator 250 is implemented by, for example, a network interface. The second communicator 250 receives the input-output data for the debugging target program generated by the data generator 100 from the data generator 100.

The debugger 210 executes the debugging assistance environment program D221. The debugger 210 includes an input-output data receiver 212 that receives input-output data and a second executor 214 that executes the debugging assistance environment program D221.

The input-output data receiver 212 receives input-output data for a debugging target program generated by the data generator 100 through the second communicator 250. The received input-output data is an example of debugging assistance information in an aspect of the present disclosure. The second executor 214 executes the debugging assistance environment program D221 stored in the second storage.

Figure 3:
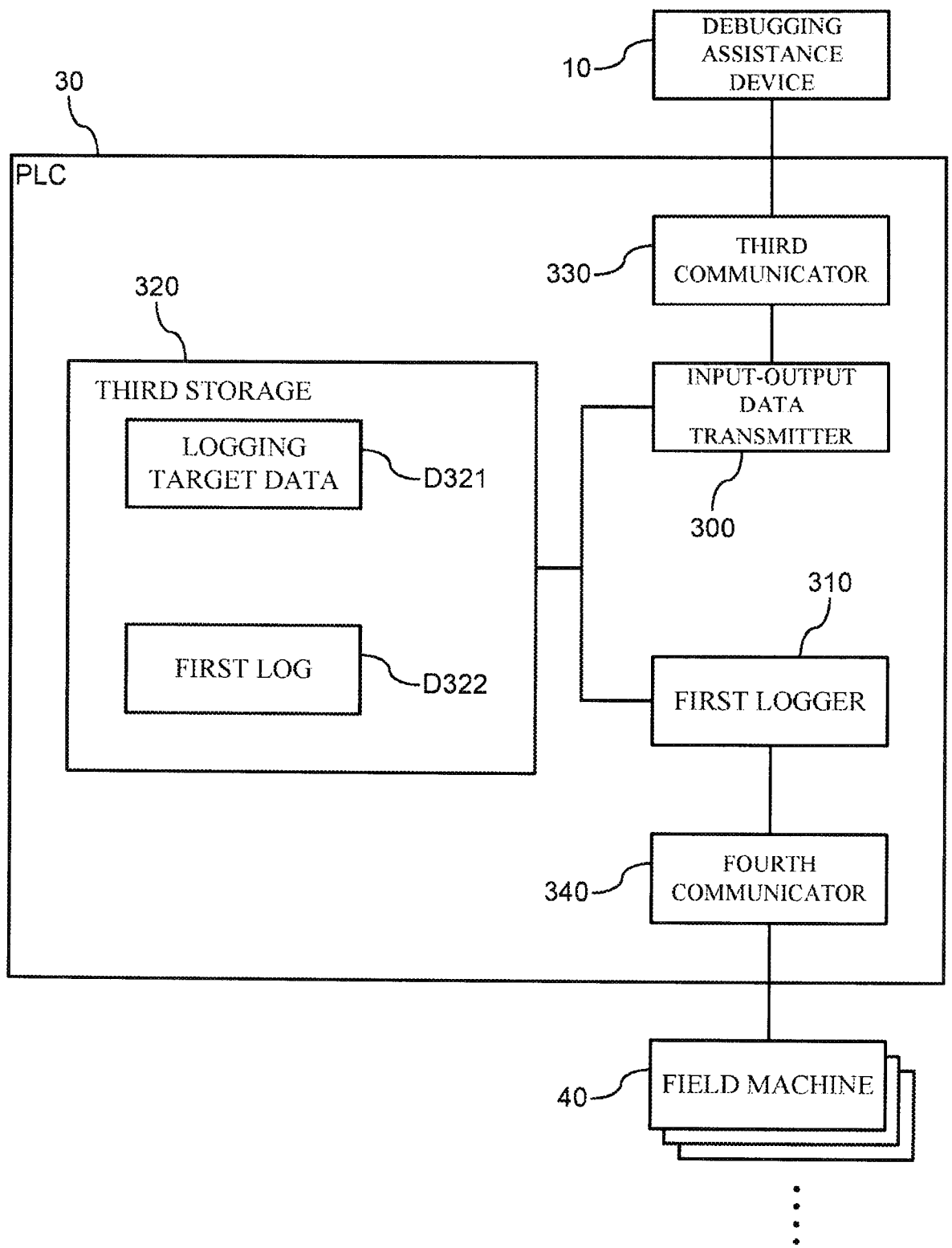
FIG. 3 is a functional block diagram of a programmable logic controller in the embodiment of the present disclosure.

The functional components of the PLC 30 are now described with reference to FIG. 3. The PLC 30 includes an input-output data transmitter 300 that transmits input-output data acquired in the PLC 30 to the debugging assistance device 10, a first logger 310 that performs logging in the PLC 30, a third storage 320 that stores data used for logging in the PLC 30, a third communicator 330 that communicates with the debugging assistance device 10, and a fourth communicator 340 that communicates with the field machines 40. The PLC 30 also includes typical functional components of a programmable logic controller in addition to the functional components described above.

The third communicator 330 communicates with the debugging assistance device 10. The third communicator 330 is implemented by, for example, a network interface. The fourth communicator 340 communicates with each field machine 40. The fourth communicator 340 is implemented by, for example, an input-output unit of the PLC 30. The first logger 310 performs logging for devices associated with the field machines 40 based on information acquired through communication with the fourth communicator 340.

The third storage 320 stores logging target data D321 and a first log D322. The logging target data D321 stores a programs as a target of the first logging performed by the PLC 30 and a device in the program as the target of the first logging. The first log D322 is log data for a device in the program as the target of the first logging. The program as the target of the first logging is a program in the first logging target program D132 in the first storage 130 in the debugging assistance device 10.

The first logger 310 records a log for a device in the program as the target of the first logging as the first log D322 in the third storage 320 in chronological order based on the logging target data D321 stored in the third storage 320. The first logger 310 is an example of logging means in an aspect of the present disclosure.

The input-output data transmitter 300 transmits the log data for a device (in other words, input-output data) stored as the first log D322 to the debugging assistance device 10 through the third communicator 330.

An example hardware configuration of the data generator 100 in the debugging assistance device 10 is now described with reference to FIG. 4. As described above, the data generator 100 is implemented by, for example, a computer such as a personal computer, a smartphone, or a tablet. The functions of the data generator 100 are implemented by such a computer that executes an engineering tool program installed on the computer. The debugging environment provider 200 has the same hardware configuration as the data generator 100.

The data generator 100 includes a processor 1001 that executes the engineering tool program, a memory 1002 that serves as a main storage area, an interface 1003 that performs communication for the data generator 100, and a secondary storage device 1004 that stores the engineering tool program. These components are connected to one another with a bus 1000.

The processor 1001 is, for example, a central processing unit (CPU). The functions of the data generator 100 are implemented by the processor 1001 that loads the engineering tool program stored in the secondary storage device 1004 into the memory 1002 and executes the program.

The memory 1002 is a main memory device including, for example, a random-access memory (RAM). The memory 1002 stores an engineering tool program loaded by the processor 1001 from the secondary storage device 1004. The memory 1002 serves as a work memory when the processor 1001 executes the engineering tool program.

The interface 1003 is an input-output (I/O) interface, such as a serial port, a universal serial bus (USB) port, or a network interface. The interface 1003 implements the functions of the first communicator 160. The interface 1003 is connected to a liquid crystal display to implement the functions of the first display 140. The interface 1003 is connected to input devices such as a mouse, a keyboard, and a touch panel to implement the functions of the first operation device 150.

The secondary storage device 1004 includes, for example, a flash memory, a hard disk drive (HDD), or a solid-state drive (SSD). The secondary storage device 1004 stores the engineering tool program executable by the processor 1001. The secondary storage device 1004 implements the functions of the first storage 130.

An example operation for a debugging assistance process performed by the debugging assistance device 10 is now described with reference to FIG. 5. Before starting the debugging assistance process, the simulation program D131 is first stored into the first storage 130. The identifier of each of the one or more programs as the target of logging among the programs executable by the PLC 30 is registered as the first logging target program D132 in the first storage 130 in the debugging assistance device 10, and as the logging target data D321 in the third storage 320 in the PLC 30. The identifier is registered using, for example, an engineering tool.

When activated, the PLC 30 controls the field machines 40 to cause the field machines 40 to perform processes. During the operation of the PLC 30, the first logger 310 logs the input-output data for a device as a target of logging in each program as the target of logging identified based on the logging target data D321, and stores and accumulates the log data as the first log D322.

Figure 5:
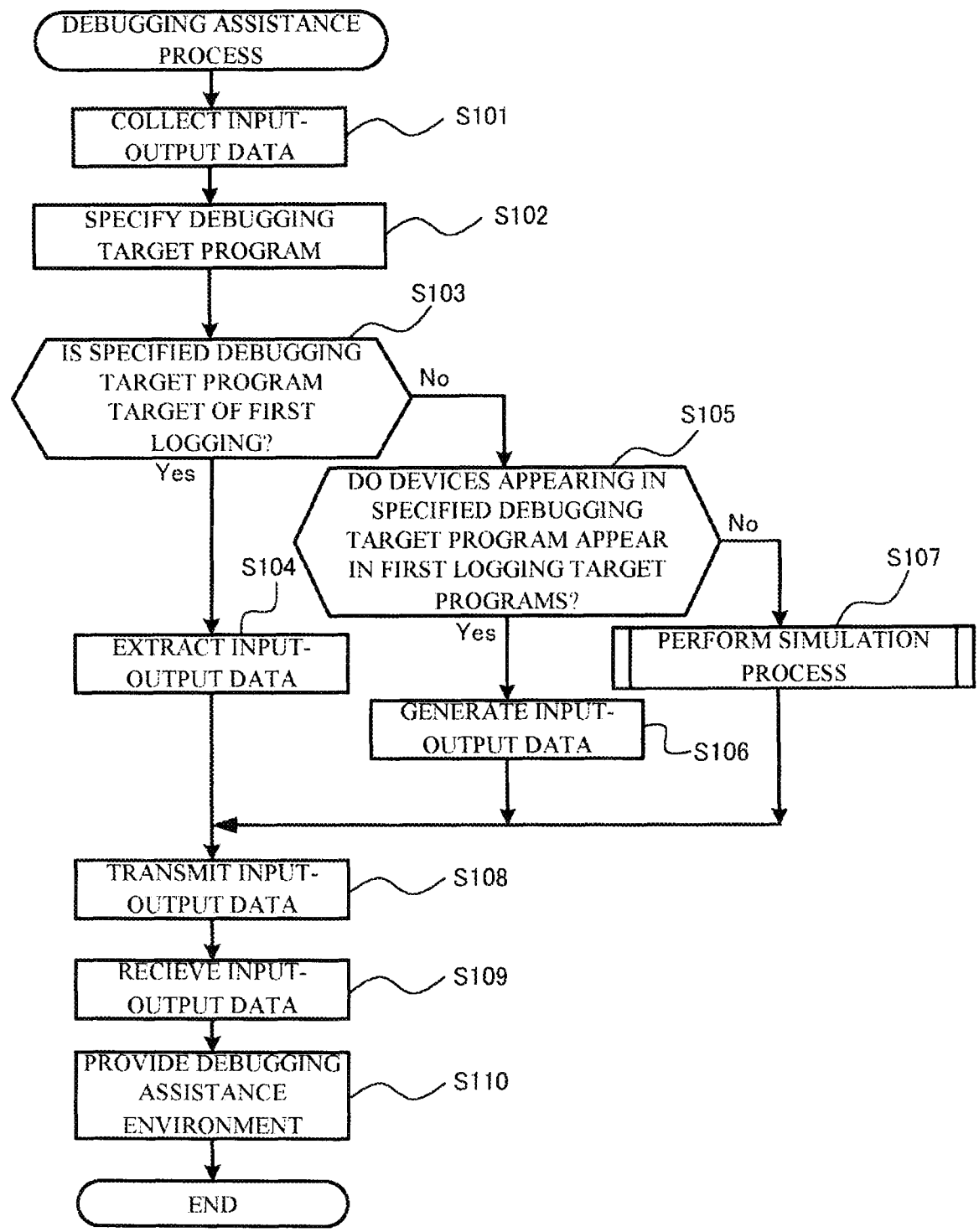
FIG. 5 is a flowchart of an example debugging assistance process performed by the debugging assistance device according to the embodiment of the present disclosure.

The operation in FIG. 5 is performed when the user executes the engineering tool program on the data generator 100 in the debugging assistance device 10. The user may execute the engineering tool program upon, for example, detecting a defect in a program executed by the PLC 30 and intending to debug the program.

Upon the start of the process, the input-output data collector 114 in the data processor 110 requests the input-output data transmitter 300 in the PLC 30 to transmit the first log D322 through the first communicator 160 and the third communicator 330. In response to the request, the input-output data transmitter 300 reads the first log D322 and transmits the first log D322 to the input-output data collector 114. The input-output data collector 114 collects the received input-output data (step S101).

The data generator 100 then displays an instruction on the first display 140 that prompts the user to specify a debugging target program. Following the instruction, the user operates the first operation device 150 and specifies a program to be debugged. At this time, the user may not be aware whether the program for which the user intends to debug has been pre-selected as a target of logging. The debugging target program specifier 112 specifies the program specified by the user as a debugging target program (step S102).

The determiner 121 determines whether the debugging target program specified by the debugging target program specifier 112 is a program designated as a target of the first logging (step S103). More specifically, the determiner 121 determines whether the program specified by the debugging target program specifier 112 is included in the first logging target program D132.

When the determiner 121 determines that the debugging target program is a target of the first logging, or in other words, included in the first logging target program D132 (Yes in step S103), the extractor 122 extracts the input-output data for the debugging target program from the input-output data collected by the input-output data collector 114 (step S104).

Step S104 is described more specifically with reference to FIG. 7. FIG. 7 is example input-output data collected by the input-output data collector 114. More specifically, the figure describes example time series data for device values for devices M0, M1, M2, and D0 and the time at which the device values are acquired. As described above, the input-output data collected by the input-output data collector 114 is the input-output data for the programs as the targets of logging by the first logger 310 in the PLC 30. The devices M0, M1, M2, and D0 in FIG. 7 are devices that appear in programs registered as the targets of the first logging in the first logging target program D132. When the specified debugging target program is determined to be a target of the first logging (Yes in step S103), the devices appearing in the debugging target program are included in the devices M0, M1, M2, and D0 in FIG. 7. For example, when M0 and M1 are the devices appearing in the debugging target program, the extractor 122 extracts the time series data for the devices M0 and M1 from the time series data in FIG. 7 (step S104).

When the specified debugging target program is determined not to be a target of the first logging (No in step S103), or in other words, when a debugging target program other than the debugging target programs registered in the first logging target program D132 is added after the collection of input-output data in step S101 is complete, the searcher-generator 123 determines whether the devices used in the debugging target program appear in the programs in the first logging target program D132 (step S105). The devices in the debugging target program not as the target of the first logging may be used by another program. The above determination is thus performed. When the devices in the debugging target program appear in another program as a target of the first logging, the input-output data for the debugging target program can be extracted from the input-output data collected by the input-output data collector 114.

In step S105, when all devices used in the debugging target program are determined to appear in a program other than the debugging target program (Yes in step S105), the searcher-generator 123 generates input-output data for the specified debugging target program (step S106). More specifically, the searcher-generator 123 generates the input-output data for the debugging target program by extracting data for the devices in the debugging target program from the input-output data collected by the input-output data collector 114.

Step S106 is described more specifically with reference to FIGS. 7 and 8. For example, when the devices in the programs in the first logging target program D132 are devices M0, M1, M2, and D0 as in FIG. 7, and the devices M0, M1, and D0 are all the devices in the specified debugging target program as in FIG. 8, all the devices in the debugging target program are included in the first logging target programs. In this case, all the devices in the debugging target program are in other programs as the targets of the first logging although a program not included in the first logging target program D132 is added or specified as a target of debugging. The input-output data for the debugging target program can thus be generated. The searcher-generator 123 extracts the time series data for the devices M0, M1, and D0 from the time series data in FIG. 7 and generates the input-output data for the debugging target program in FIG. 8 (step S106).

When at least one of the devices in the debugging target program is determined not to be appearing in the first logging target programs in step S105 (No in step S105), the simulator 124 performs a simulation process (step S107). The input-output data for the specified debugging target program cannot be generated by extracting data from the input-output data collected by the input-output data collector 114. The simulation process is thus performed.

Figure 6:
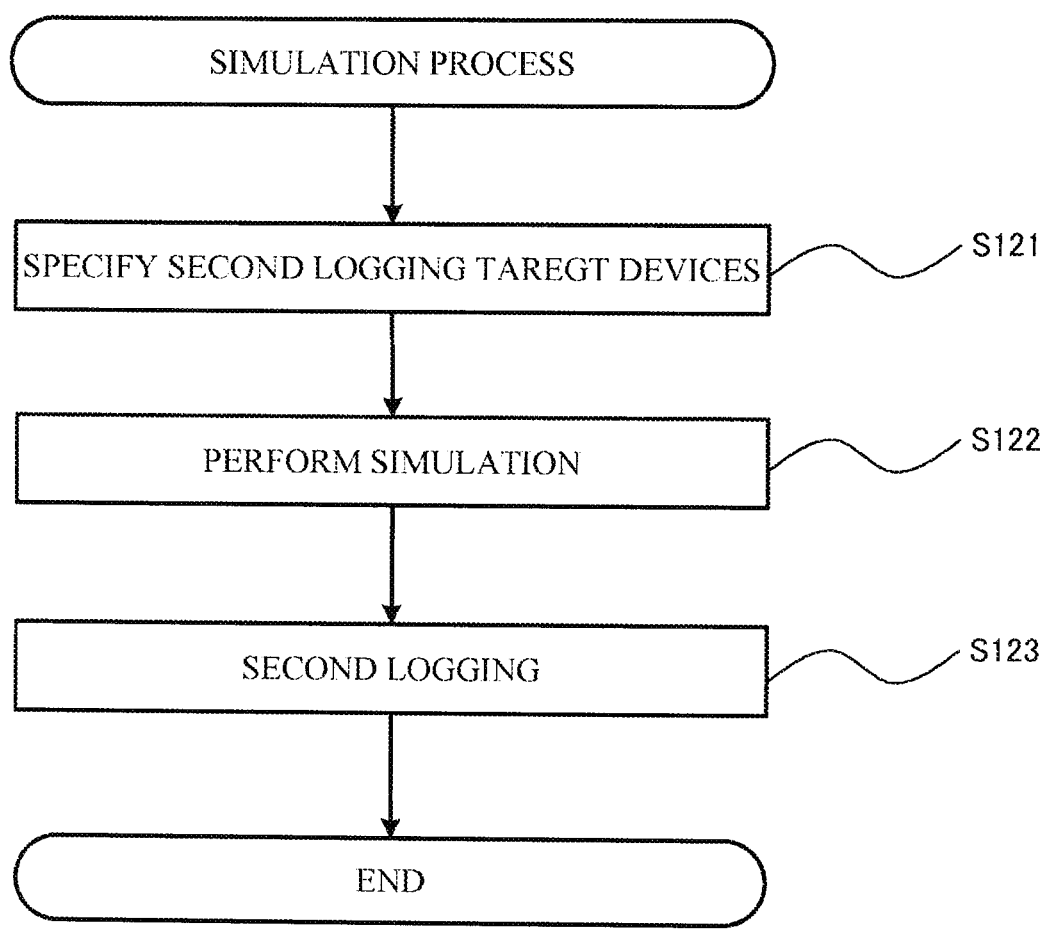
FIG. 6 is a flowchart of an example simulation process performed by the debugging assistance device illustrated in FIG. 1.

The simulation process in step S107 is described with reference to the flowchart in FIG. 6. The device specifier 125 registers all the devices in the additionally specified debugging target program, or specifically, devices M3, M4, M5, and D1, in the second logging target device D133 in the first storage 130 (step S121) as illustrated in FIG. 9. The first executor 126 executes the simulation program D131 for simulating the operation of the PLC 30 (step S122). For example, upon starting the simulation program D131, the first executor 126 extracts device values corresponding to the input data for the debugging target program from the input-output data collected by the input-output data collector 114 based on the intended time of simulation, and provides the data sequentially to the simulation program D131 to sequentially perform processes.

The second logger 127 records, based on the second logging target device D133, a log for the devices to be the targets of the second logging as the second log D134 in the first storage 130 (step S123). For example, the input-output data for the debugging target program in FIG. 9 is generated in the second log D134. Thus, when the debugging target program is not a target of the first logging, the input-output data for the debugging target program can be generated in the second logging by the simulator 124.

After one of steps S104, S106, or S107 in FIG. 5 is complete, the transmitter 116 transmits the input-output data for the debugging target program generated by the input-output data generator 120 to the debugging environment provider 200 (step S108). As the input-output data, one of the input-output data extracted by the extractor 122, the input-output data generated by the searcher-generator 123, or the input-output data generated in the simulation process is transmitted.

The input-output data receiver 212 in the debugger 210 receives the input-output data for the debugging target program transmitted by the transmitter 116 through the second communicator 250 (step S109). The debugging environment provider 200 in which debugging is performed by the debugging operator receives the input-output data for the debugging target program alone. Thus, debugging is assisted without the debugging operator receiving information unused for debugging from the data generator 100, such as programs that are not targets of debugging, or confidential information in the PLC 30 and the data generator 100.

Figure 10:
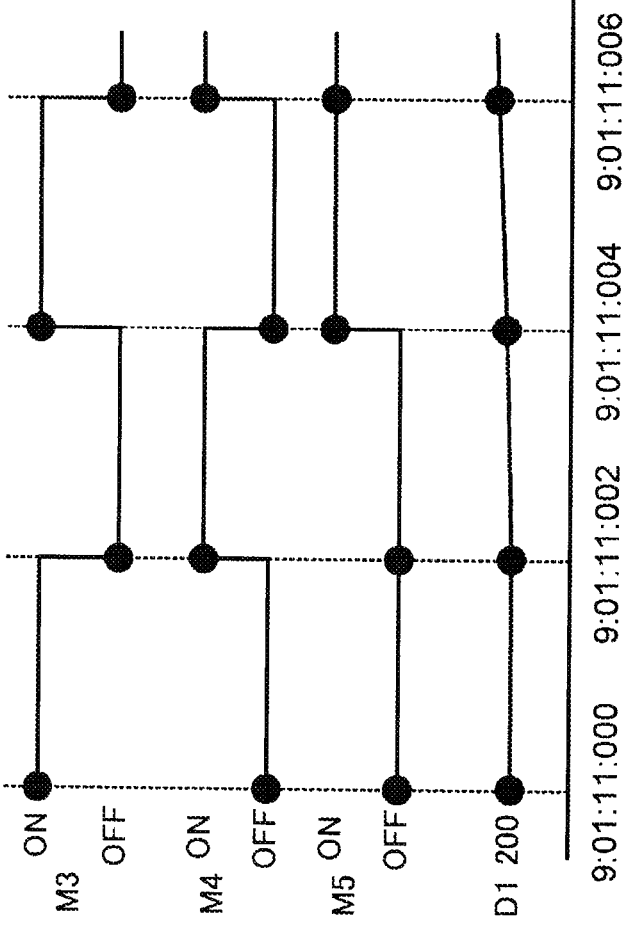
FIG. 10 is diagram of example input-output data displayed on a second display in a debugging assistance environment illustrated in FIG. 1.

The second executor 214 executes the debugging assistance environment program D221 stored in the second storage 220 based on the input-output data for the debugging target program received by the input-output data receiver 212 (step S110). The debugging assistance environment program D221 is executed to display the input-output data for the debugging target program on the second display 230. For example, time-series input-output data in the debugging target program is displayed on the second display 230 in a tabular form and in a graphical form as illustrated in FIG. 10. The debugging operator can debug the debugging target program by verifying the debugging target program stored in the debugging target storage data D222 based on the information displayed.

The production system 1 with debugging assistance according to the embodiment has the configuration described above. The debugging assistance device 10 in the production system 1 with debugging assistance includes the input-output data generator 120 that generates input-output data for debugging target programs based on input-output data collected by the input-output data collector 114. When the specified debugging target program is an additional debugging target program that is not included in the predetermined debugging target programs, but all devices used in the additional debugging target program are included in the predetermined debugging target programs, the input-output data generator 120 uses a log that has already been collected. When the specified debugging target program is an additional debugging target program that is not included in the predetermined debugging target programs, and at least one of the devices used in the additional debugging target program is not included in the predetermined debugging target programs, the input-output data generator 120 generates input-output data representing a log for the devices in the debugging target program by executing a simulation program that simulates the operation of the PLC 30. Thus, with a debugging target program that is not a predetermined target of log data collection, debugging can be assisted based on input-output data generated by the input-output data generator 120. The data generator 100 simply transmits the input-output data for the debugging target program to the debugging environment provider 200. This prevents information unused for debugging as well as confidential information in the PLC 30 and the data generator 100 from leaking outside.

Modifications

The above embodiments may be modified in various manners.

For example, in the embodiment, the transmitter 116 simply transmits the input-output data for the debugging target program generated by the data generator 100 to the debugging environment provider 200. However, the debugging environment provider 200 may not include the debugging assistance environment program D221 or the debugging target storage data D222 that stores debugging target programs. The data processor 110 in the data generator 100 may further include a project generator that creates a project file. A project file contains the debugging assistance environment program D221, input-output data for the debugging target programs, and the debugging target programs. The transmitter 116 transmits the project file to the debugging environment provider 200. This allows debugging of a debugging target program to be assisted when the debugging environment provider 200 does not include the debugging assistance environment program D221 or the debugging target program. The project generator corresponds to project generation means in an aspect of the present disclosure.

The debugging assistance device 10 according to the embodiment includes two personal computers, or specifically, one serving as the data generator 100 and the other serving as the debugging environment provider 200, but the debugging assistance device 10 may include a single personal computer. For example, a personal computer serving as the data generator 100 may serve as the debugging environment provider 200. Protective measures such as restricting the scope of access by the debugging operator can reduce the likelihood that confidential information in the PLC 30 and the data generator 100 is provided to the debugging operator.

In the embodiment, when the specified debugging target program is determined not to be a target of the first logging in step S103 in FIG. 5 (No in step S103), the input-output data is generated through a process in step S106 or step S107 based on the determination in step S105, but the present disclosure is not limited to this example. For example, when the specified debugging target program is determined not to be a target of the first logging (No in step S103), the simulation process (step S107) may be performed without the determination process in step S105.

In the embodiment, when at least one of the devices used in the additionally specified debugging target program is determined not to be appearing in the predetermined debugging target programs in step S105 in FIG. 5 (No in step S105), the simulation process is performed (Step S107). However, the present disclosure is not limited to this example. For example, when not all but one or more of the devices used in the additionally specified debugging target program are determined to be appearing in the predetermined debugging target programs, the debugging environment provider 200 may, for example, inform the user of the status and any available input-output data and inquire of the user whether to perform the simulation process (step S107). The simulation process (step S107) may then be performed in response to such an instruction.

In the embodiment, the debugging assistance environment program D221 is executed to display input-output data on the second display 230 in a tabular form and a graphical form as illustrated in FIG. 10, but the present disclosure is not limited to this example. For example, in addition to the input-output data in a tabular form and a graphical form, the debugging target programs stored in the debugging target storage data D222 in the second storage 220 may be displayed on the second display 230.

Figure 4:
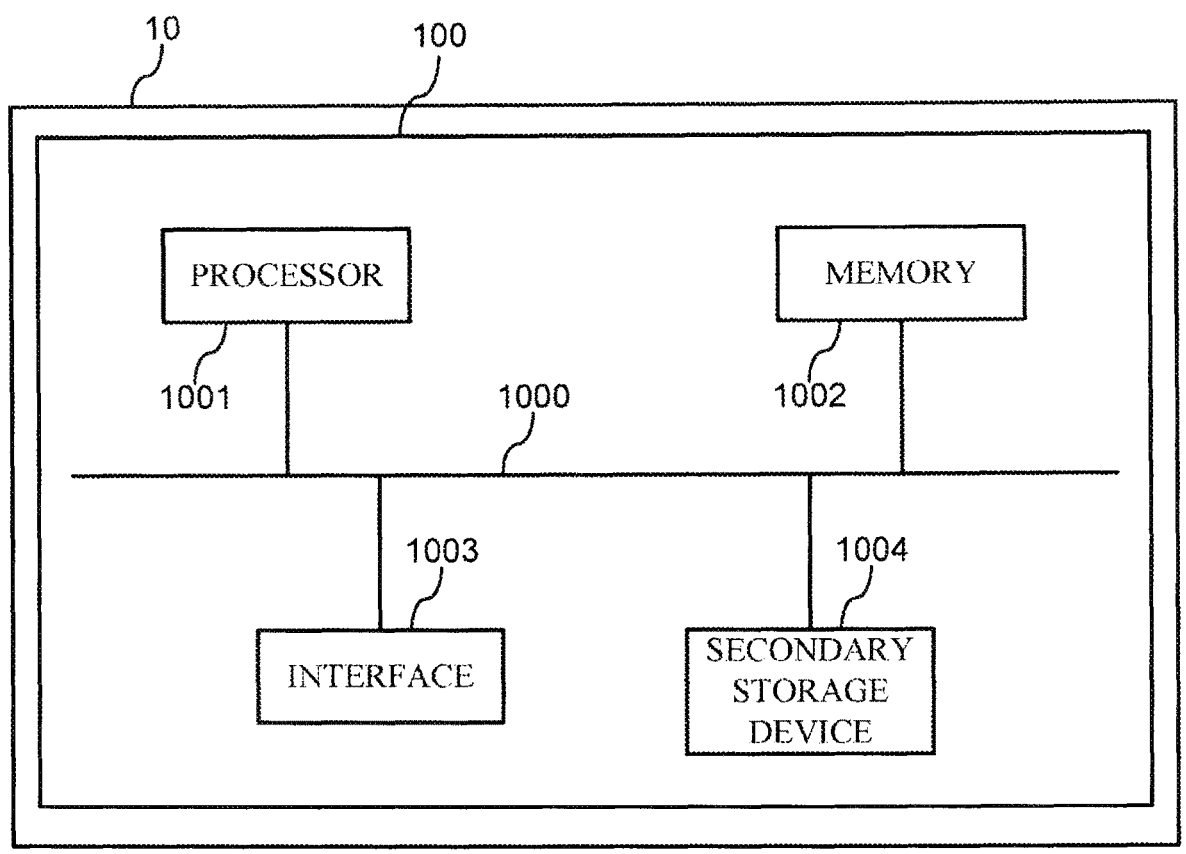
FIG. 4 is a diagram of a data generator in the debugging assistance device according to the embodiment of the present disclosure, illustrating an example hardware configuration.

In the hardware configuration illustrated in FIG. 4, the debugging assistance device 10 includes the secondary storage device 1004. However, the secondary storage device 1004 may be external to the debugging assistance device 10, and the debugging assistance device 10 and the secondary storage device 1004 may be connected to each other with the interface 1003. In this configuration, the secondary storage device 1004 may be a removable medium such as a USB flash drive or a memory card.

In place of the hardware configuration illustrated in FIG. 4, the debugging assistance device 10 may have a dedicated circuit including an application-specific integrated circuit (ASIC) or a field-programmable gate array (FPGA). In the hardware configuration illustrated in FIG. 4, some functions of the debugging assistance device 10 may be implemented by, for example, a dedicated circuit connected to the interface 1003.

The program used in the debugging assistance device 10 may be distributed on a non-transitory computer-readable recording medium such as a compact disc read-only memory (CD-ROM), a digital versatile disc (DVD), a USB flash drive, a memory card, or an HDD. A specific or a general-purpose computer on which the program is installed can function as the debugging assistance device 10.

The programs may be stored in a storage device in another server on the Internet and may be downloaded from the server.

The debugging assistance device 10 may be unconnected with the PLC 30 through a communication line (offline). The debugging assistance device 10 may acquire logging data for the PLC 30 recorded on a non-transitory computer-readable recording medium. For example, the input-output data logged by the PLC 30 may be output in advance to a secure digital (SD) memory card, and the input-output data collector 114 may collect the input-output data output to the SD card.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Production system with debugging assistance
10 Debugging assistance device

30 PLC
40 Field machine
100 Data generator
110 Data processor
112 Debugging target program specifier
114 Input-output data collector
116 Transmitter
120 Input-output data generator
121 Determiner
122 Extractor
123 Searcher-generator
124 Simulator
125 Device specifier
126 First executor
127 Second logger
130 First storage
140 First display
150 First operation device
160 First communicator
200 Debugging environment provider
210 Debugger
212 Input-output data receiver
214 Second executor
220 Second storage
230 Second display
240 Second operation device
250 Second communicator
300 Input-output data transmitter
310 First logger
320 Third storage
330 Third communicator
340 Fourth communicator
1000 Bus
1001 Processor
1002 Memory
1003 Interface
1004 Secondary storage device
D131 Simulation program
D132 First logging target program
D133 Second logging target device
D134 Second log
D221 Debugging assistance environment program
D222 Debugging target storage data
D321 Logging target data
D322 First log

The invention claimed is:

1. A debugging assistance device for assisting in debugging of a program executable by a programmable logic controller, the debugging assistance device comprising:
first processing circuitry to
collect, from the programmable logic controller, input-output data representing a log for a device in a program predetermined as a logging target program of one or more programs executable by the programmable logic controller, and
generate, when a debugging target program is determined not to be included in the predetermined program, input-output data representing a log for a device in the debugging target program by executing a simulation program simulating an operation of the programmable logic controller.

2. The debugging assistance device according to claim 1, wherein
the first processing circuitry
determines whether the debugging target program is included in the predetermined program,
determines, when determining that the debugging target program is not included the predetermined program, whether input-output data for the device in the debugging target program is included in the input-output data collected by the first processing circuitry,
extracts, when the input-output data for the device in the debugging target program is determined to be included in the input-output data collected by the first processing circuitry, the input-output data for the device in the debugging target program from the input-output data collected by first processing circuitry and generates the extracted input-output data as the input-output data for the debugging target program, and
generates, when the input-output data for the device in the debugging target program is determined not to be included in the input-output data collected by the first processing circuitry, the input-output data for the debugging target program by executing the simulation program.

3. The debugging assistance device according to claim 2, wherein
when the debugging target program is determined to be included in the predetermined program, the first processing circuitry generates the input-output data collected by the first processing circuitry as input-output data.

4. The debugging assistance device according to claim 2, wherein
the first processing circuitry presents the input-output data generated by the first processing circuitry.

5. The debugging assistance device according to claim 2, wherein
the first processing circuitry specifies the debugging target program.

6. The debugging assistance device according to claim 2, wherein
the first processing circuitry generates a project file being information to assist in debugging of the debugging target program, and
the project file includes the input-output data generated by the first processing circuitry, the debugging target program, and a debugging assistance environment program to provide a debugging assistance environment for the debugging target program.

7. A control system, comprising:
the debugging assistance device according to claim 2; and
a programmable logic controller to control a machine,
wherein the programmable logic controller comprises second processing circuitry,
the second processing circuitry records the log for the device in the predetermined program, and
the first processing circuitry acquires the log recorded by the second processing circuitry.

8. The debugging assistance device according to claim 1, wherein
when the debugging target program is determined to be included in the predetermined program, the first processing circuitry generates the input-output data collected by the first processing circuitry as input-output data.

9. The debugging assistance device according to claim 8, wherein
the first processing circuitry presents the input-output data generated by the first processing circuitry.

10. The debugging assistance device according to claim 8, wherein the first processing circuitry specifies the debugging target program.

11. The debugging assistance device according to claim 8, wherein
the first processing circuitry generates a project file being information to assist in debugging of the debugging target program, and
the project file includes the input-output data generated by the first processing circuitry, the debugging target program, and a debugging assistance environment program to provide a debugging assistance environment for the debugging target program.

12. The debugging assistance device according to claim 1, wherein
the first processing circuitry presents the input-output data generated by the first processing circuitry.

13. The debugging assistance device according to claim 12, wherein
the first processing circuitry specifies the debugging target program.

14. The debugging assistance device according to claim 12, wherein
the first processing circuitry generates a project file being information to assist in debugging of the debugging target program, and
the project file includes the input-output data generated by the first processing circuitry, the debugging target program, and a debugging assistance environment program to provide a debugging assistance environment for the debugging target program.

15. The debugging assistance device according to claim 1, wherein
the first processing circuitry specifies the debugging target program.

16. The debugging assistance device according to claim 15, wherein
the first processing circuitry generates a project file being information to assist in debugging of the debugging target program, and
the project file includes the input-output data generated by the first processing circuitry, the debugging target program, and a debugging assistance environment program to provide a debugging assistance environment for the debugging target program.

17. The debugging assistance device according to claim 1, wherein
the first processing circuitry generates a project file being information to assist in debugging of the debugging target program, and
the project file includes the input-output data generated by the first processing circuitry, the debugging target program, and a debugging assistance environment program to provide a debugging assistance environment for the debugging target program.

18. A control system, comprising:
the debugging assistance device according to claim 1; and
a programmable logic controller to control a machine,
wherein the programmable logic controller comprises second processing circuitry,
the second processing circuitry records the log for the device in the predetermined program, and
the first processing circuitry acquires the log recorded by the second processing circuitry.

19. A debugging assistance method, comprising:
executing software instructions in one or more processing circuitries to collect, from a programmable logic controller, input-output data representing a log for a device in a program set as a logging target program; and
executing software instructions in one or more processing circuitries to generate, when a debugging target program is not included in the logging target program, input-output data representing a log for a device in the debugging target program by simulating an operation of the programmable logic controller.

20. A non-transitory computer-readable recording medium storing a program, the program causing a computer to perform operations comprising:
collecting, from a programmable logic controller, input-output data representing a log for a device in a program set as a logging target program; and
generating, when a debugging target program is not included in the logging target program, input-output data representing a log for a device in the debugging target program by simulating an operation of the programmable logic controller.

* * * * *